Aug. 15, 1961   R. J. HOLTON   2,995,790
FASTENING DEVICE
Filed July 31, 1959
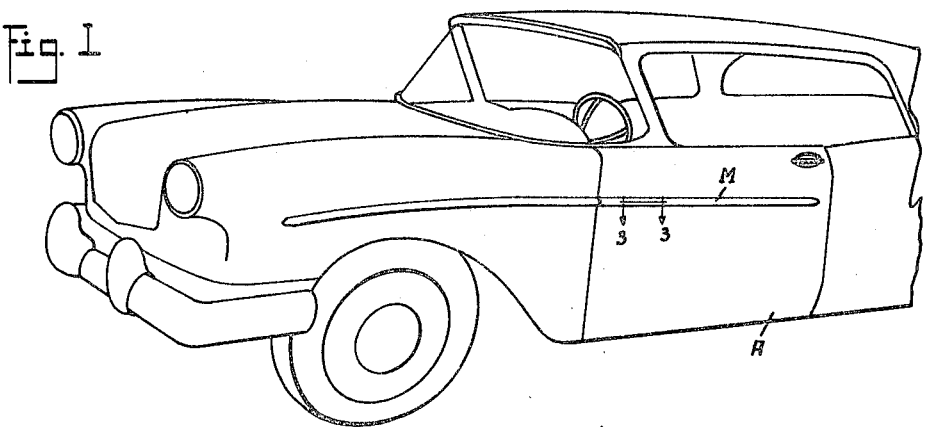
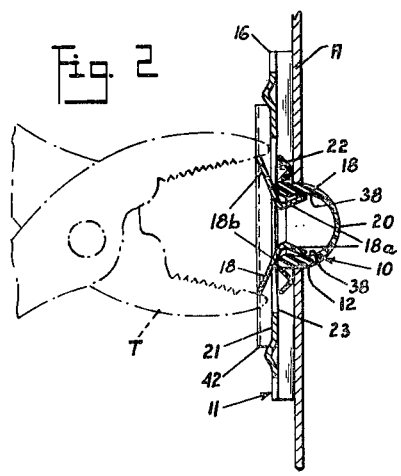
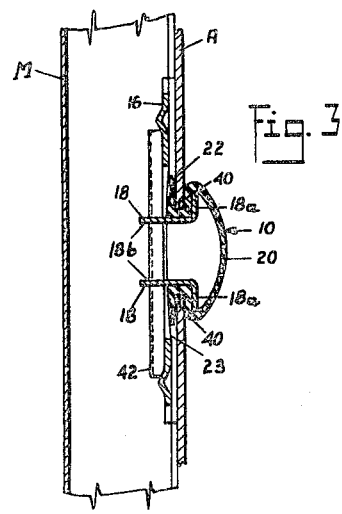
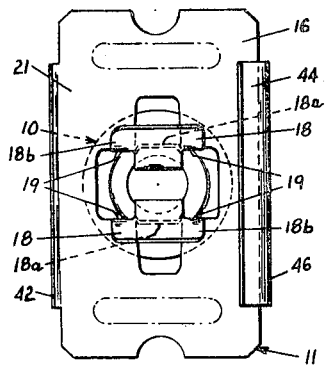
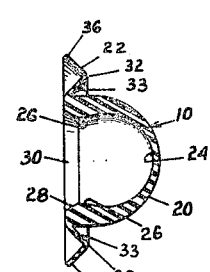
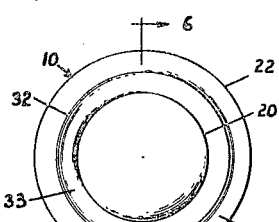
INVENTOR.
ROBERT J. HOLTON
BY
Teare, Kramer, Sturges & Fetzer
ATTORNEYS 2,995,790
FASTENING DEVICE
Robert J. Holton, Cleveland, Ohio, assignor to Tinnerman Products, Inc., Cleveland, Ohio, a corporation of Ohio
Filed July 31, 1959, Ser. No. 830,926
6 Claims. (Cl. 24—73)

This invention relates in general to clips or fasteners for mounting moldings, trim strips, cables and other objects on a supporting part, and more particularly concerns a combined, securing and sealing fastener assembly which is adapted to be positively secured in a work opening in a supporting part by an operation taking place entirely from the outer or accessible side of the supporting part, and which will effectively seal the work opening against the entry of water, dust, foreign matter and the like.

Clip fasteners for securing molding and the like on a supporting part in combination with a sealing portion or plug for sealing the work opening in the supporting part are known in the art. One such arrangement is disclosed in the copending application of Robert J. Holton, Serial No. 704,065, filed December 20, 1957, and issued February 16, 1960, as United States Patent 2,924,864.

The present invention provides an improved detachable sealing plug or element as compared to that of the aforementioned application, and which may be readily and quickly assembled in interlocking relationship with a clip proper, to form a combined securing and sealing device which may be easily assembled and secured in positive sealing relationship in the work opening of the supporting part. The sealing plug or element of the invention may also be readily disassembled from the clip proper and is of a type which may be economically manufactured, using mass production methods, to provide a highly advantageous securing clip and sealing assembly.

The sealing element or plug, with which the present invention is particularly concerned, broadly comprises a generally hollow cap or head portion which is adapted to receive therein arm portions of the clip proper in holding relationship, for mounting the sealing element in assembled relationship on the clip, and a peripherial flange portion having a novel corrugated-like configuration, and which is adapted to overlap the marginal edges of the work opening in the supporting part and to be compressed between the supporting part and the body of the clip, for positively sealing the work opening in the supporting part. The clip proper of the combined securing and sealing device may be of the general character disclosed in the aforementioned pending application broadly comprising a sheet metal element defining a body or base carrying a pair of arms which include shank portions, that as aforementioned are receivable in the head portion of the sealing element and through the work opening, and which deform the head portion of the sealing element or plug into positive sealing relationship and at the same time draw the body of the clip proper toward the supporting part to compress the peripherial flange portion of the sealing element against the confronting surface of the supporting part, and which also secure the clip in fastened position on the supporting part by expansion of the shank portions into locking relationship with marginal portions of the work opening in the supporting part.

Accordingly, an object of the invention is to provide an improved sealing element or plug which can be readily assembled with and disassembled from an associated object securing clip, and which will effectively seal a work opening in a supporting part in which the clip proper is mounted.

Another object of the invention is to provide a sealing element of the latter mentioned type which is comparatively simple in nature and which may be economically produced, being particularly adapted to mass production methods.

A further object of the invention is to provide a sealing element which is formed of relatively soft and pliable material for ready detachable assembly with an associated fastening device, for effectively sealing a work opening in the supporting part on which the fastening device is adapted to be mounted, and which comprises a hollow-dome-like head portion and a base in the form of a peripherial flange or brim portion, such peripherial flange portion embodying a circumferentially extending ridge or corrugation which is adapted to be deformed by the clip proper into sealing relationship with marginal portions of the work opening on the supporting part upon securing of the fastening device to the supporting part.

Another object of the invention is to provide a combined sealing and securing assembly in the form of a clip fastener and wherein the sealing element of the assembly may be readily attached to and detached from the clip proper, and wherein the fastener assembly can be quickly and securely fastened over a work opening in a supporting part or panel, with a portion of the sealing element of the assembly extending through the work opening, and which possess improved sealing characteristics against the entry of water, dust, etc. passing or seeping through the work opening in the supporting part.

Other features and advantages of the invention will be apparent from the following description taken in conjunction with the accompanying drawings wherein:

FIG. 1 is a perspective more or less diagrammatic view illustrating one environmental setting in which the securing and sealing clip of the present invention may be advantageously used, and more particularly shows an automotive vehicle having a trim strip or molding mounted on a side thereof by the fastener and sealing clip assembly of the instant invention.

FIG. 2 is an enlarged, horizontal sectional view of the securing and sealing clip fastener assembly of the invention in its preliminary assembled form on a supporting panel or the like, with a tool engaging the arms of the clip proper in the procedure for attaching the clip in secured and sealing relationship on the supporting panel.

FIG. 3 is an enlarged, horizontal sectional view generally similar to FIG. 2 and taken substantially along line 3—3 of FIG. 1, but illustrating the clip and sealing plug in finalized secured and sealing position on the supporting part, and with a trim strip or molding being held in fastened position on the supporting part by the clip fastener.

FIG. 4 is an enlarged front or outer side view of the clip and sealing element assembly of the invention prior to securement of the latter to an apertured supporting panel.

FIG. 5 is an enlarged end elevational view of the sealing element of the invention.

FIG. 6 is a vertical sectional view taken generally along line 6—6 of FIG. 5, looking in the direction of the arrows.

Referring now again to the drawings, there is disclosed a preferred form of the sealing element or plug 10, and the combined securing clip and sealing element assembly which is adapted to be applied in secured relation in a work opening 12 in a supporting part, such as a panel A or the like, for mounting a molding M or other object on the supporting part A.

The supporting part A is generally in the form of a plate or panel, or the like, as for instance the side panel of the automotive vehicle shown in FIG. 1, and is provided with a series of spaced openings 12 for the required number of clips 11 to be secured thereto along the path which the molding M is to extend when in mounted position. The panel A may be of any suitable material such as metal, wood, plastic, fiber-wood and the like, and the openings 12 therein may be round, rectangular or of any suitable outline, but are generally and preferably provided in the manner of circular holes which involve the most inexpensive means of producing the same.

The clip or fastener proper 11 is preferably a simple inexpensive article of manufacture which is readily constructed from any suitable malleable sheet metal, such as cold rolled steel or malleable spring metal. Such malleable type metal possesses the characteristic that it may be permanently deformed upon predetermined application of force, as distinguished from a purely spring type metal which when bent will usually return to its original position upon removal of the bending force. The securing clip member 11 is preferably comprised of a sheet metal blank which defines the generally planar base or body 16 of the clip proper, and is provided with a partially severed area preferably in the approximate center thereof as best seen in FIG. 4, forming a pair of movable arms 18 which are bendable, or hingedly connected to base 16 along bend lines 19 generally disposed intermediate opposite free ends of each of the arms, and substantially in the plane of the base. The base 16 preferably possesses a slight arcuate configuration in a transverse direction for insuring a generally tensioned engagement between the clip body and the supporting panel when the clip and sealing device assembly is in mounted and secured relation on the panel. The general arrangement of a suitable clip proper is disclosed in the aforementioned pending application, with the movable arms 18 comprising tongue or shank portions 18a joined to tab or head portions 18b. Each of the tabs 18b has a free end and is bendably connected to the base of the clip along the aforementioned bend lines 19 and carries the tongue or shank portion 18a which extends generally in the opposite direction as compared to said tab portion 18b. When the arms 18 are bent from the base or body 16 of the clip as shown, the free ends of the tab elements 18b project outwardly from the front or outer surface 21 of the clip base while the free ends of the tongues or shanks 18a project inwardly or rearwardly from the inner or undersurface 23 of the clip base. The arms 18 thus are united to the fastener base 16 in a bendable connection intermediate the length of the arms and in a manner whereby the tongue or shank portions 18a at the inner or under surface of the clip base are movable outwardly from each other responsive to inward movement of the respective head or tab element 18b projecting from the forward or outer surface of the base, and where they are, therefore, readily accessible for actuation, for securing the clip or fastener in a work opening, such an operation taking place entirely from the outer side of a support panel.

Preferably the head or tab elements 18b are initially provided in outwardly divergent relationship, substantially as shown in FIGS. 2 and 4, with the tongue or shanks 18a carried thereby curved or directed initially inwardly toward one another and then outwardly away from one another to provide a pair of cooperating shank elements in the form of outwardly extending hooks or the like, projecting from the undersurface of the fastener base 16. Such shank portions are adapted to be readily received through the work opening 12 in the panel A when in assembled relation with a sealing plug element 10, for securing the clip to the supporting part, and for urging or deforming the sealing plug into positive sealing relationship with marginal portions of the work opening, as will be hereinafter described in greater detail.

The separable or detachable sealing element or plug 10, with which the invention is particularly concerned, is preferably formed of soft pliable plastic or rubber-like material, and comprises a generally hollow preferably dome-shaped head portion 20 and a base in the form of a peripherial flange or brim portion 22 which extends generally radially outwardly from the head portion. Plug element 10 is of an uncomplicated configuration which readily lends itself to mass-production methods, thereby resulting in an inexpensive sealing element.

Referring in particular to FIG. 6, it will be seen that the inner surface of the plug element, which defines the open cavity or pocket 24 in the plug, generally converges as at 26 in a direction towards the flange or brim portion 22 and then diverges generally outwardly as at 28 to form a relatively wider entranceway 30 into the cavity 24.

Brim portion 22 is made of sufficient radial extension so as to substantially overlap the confronting marginal portions of the work opening 12 in panel A, while the head portion 20 of the sealing plug is preferably of a size to be readily received in relatively close fitting relationship in the work opening 12 and as is clearly shown in FIG. 2 of the drawings.

In accordance with the invention, the flange portion 22 of the sealing element 10 is of a configuration to give greatly enhanced sealing characteristics to the clip and sealing element assembly, upon securement of the latter in a work opening of the supporting part A. In this connection, the flange 22 comprises a circumferentially extending ridge or corrugation 32 which faces in the direction of projection of head portion 20 of the element, and which is adapted to engage confronting marginal portions of the supporting panel A adjacent the work opening 12 and in encircling relation to the latter, and as shown in FIG. 2. In other words, the flange comprises an inner portion 33 which extends diagonally rearwardly in the general direction of projection of head portion 20 of the plug element, and an outer portion 36 which extends generally diagonally forwardly from the inner portion, to thereby provide a deformable flange insuring sealing contact between the flange and the confronting surface of the supporting panel A, and insuring contact between the flange and the undersurface 23 of the base portion 16 of the clip proper. The inner portion 33 of the flange is in effect operable in the manner of a "suction cup" when the flange is forced by the clip proper into engagement with the confronting surface of the supporting panel, such an arrangement being particularly advantageous for providing good sealing if the supporting panel is of arcuate surface configuration, as often times occurs and especially in the automotive environment illustrated.

In mounting the securing and sealing clip assembly on the supporting part or panel A, a sealing plug or element 10 of the invention is first positioned over the shank portions 18a of the arms 18 of the clip proper and then is forced downwardly into seating relationship with the rearward or underside 23 of the body 16 of the clip. In this connection, the outwardly flared portion 28 of the sealing cap member 10 coacts in sliding relationship with the free ends of the shank portions of the arms and served to cam the shank portions through the inwardly restricted entranceway 30 of the sealing plug into the cavity 24. During movement of the shank portions into the cavity 24, the material of the sealing element may be deformed slightly or stretched, so as to permit passage of the shank portions therethrough, but once the shank portions pass the ridge 26 on the inner cavity surface of the sealing plug, the elastic memory or resiliency of the material of the sealing element causes the latter to assume its normal substantially non-deformed shape, with the sealing element being held in positive assembled position on the clip proper, by the interlocking coaction between the shank portions 18a and the obliquely disposed abutment surfaces 38 on the inner surface of the cavity 24, and as shown in FIG. 2 of the drawings.

The proper number of work openings are prepared in a line running along a predetermined path in which for instance the molding M is to extend, and the coacting head portion 20 of the sealing element 10 and shank portions 18a of the arms 18 of a clip and sealing element assembly are fed through each of the work openings substantially as shown in FIG. 2. The size of the work opening is preferably such that the head portion 20 and shank portions 18a are readily received therethrough, with the outer surface of the dome of the sealing element just barely touching the defining surface of the work opening, and the free ends of the shank portions projecting beyond the rearward or underside of the panel A. The tabs 18b which have free ends projecting from the front side of the assembly are readily accessible for quick and easy actuation by a suitable tool, such as a pliers T shown in FIG. 2, to compress the tabs from their diverging relationship shown in FIG. 2 to substantially the parallel relationship shown in FIG. 3.

Such movement of the tabs 18a towards each other causes the arms including the shank portions 18b to pivot about their bendable connections to base 16 in a manner whereby the shanks are forced outwardly with respect to one another and overlap the adjacent edges of the work opening 12 on the rearward or underside of the support panel A. During such movement of the shank portions 18a to generally permanently deformed positions, the head portion 20 of the sealing element may be stretched in the direction of the movement of the shank portions, whereby portions of the defining wall of the head 20 are urged into overlapping relationship with marginal edge portions of the panel A around the work opening 12. As the free ends of the shank portions 18a of the arms 18 deform and urge sections of the head portion 20 of the sealing element into generally co-planar relationship with respect to the rearward or underside of the panel A and urge portions of the head 20 into intimate sealing relation with the periphery of the work opening, the arms also draw the body 16 of the clip proper towards and into generally tensioned engagement with the front or outer side of the support panel A, while at the same time compressing the rim or flange portion 22 of the sealing element 10 and urging the corrugation 32 into positive sealing engagement against marginal portions of the front side of the support panel. The aforementioned deformable ridge configuration of the brim portion 22 thus insures a continuous positive sealing engagement between the inner side of the flange and the confronting surface of the panel and insures engagement between the outer side of the flange and the confronting surface or undersurface 23 of the base 16 of the clip proper, and therefore insures a positive sealing of the work opening 12 in the panel. The aforementioned generally arcuate configuration of the base 16 of the clip proper provides for the tensioned engagement of the clip body with the support panel, and therefore aids in maintaining the clip in proper assembled position on the panel A. It will be seen therefore, that the sealing element 10 is effectively urged into overlapping sealing relationship with both sides of the support panel A adjacent the work opening, and is held in such relationship by the arms 18 and body 16 of the clip proper and that the arms 18 also urge the head portion 20 of the sealing element into sealing relationship as at 40 (FIG. 3) with defining surfaces of the work opening 12, to provide a very effective seal against entry of water, dust and the like.

The molding M is then positioned over the clips with one of the conventional inturned flanges of the molding disposed in overlapping interlocked relation with flange 42 on the clip body and with the extremity of the other conventional flange of the molding engaging the cam surface 44 on the other of the flanges 46 on the body of the clip. When downward pressure is exerted on the top of the molding M, the free end of the non-interlocked flange on the molding is sprung into interlocked relation with the flange 46 in a manner well-known to those skilled in the art, to complete the mounting of the molding M on the panel or other supporting part. This operation is in a nature of a snap fastening action which takes place as a result of the inherent resiliency of the inturn flanges on the molding.

If it becomes desirable or necessary to replace or repair the supporting panel A, as often occurs in the automative environmental setting illustrated, the molding M may be readily snapped out of interlocking relationship with the flanges on the clip body, the tabs 18b on the arm 18 then being accessible for bending away from one another, whereby the shank portions 18a are moved inwardly toward one another and out of interlocking relationship with the inner or underside of the supporting panel. The securing and sealing clip assembly can then be easily withdrawn from the work opening 12. It will be seen that the clips and associated sealing elements may be used again if desired in re-assembling the molding on new panel or on the same panel, or new sealing elements may be easily assembled with the clips and then the clips can be conveniently re-assembled upon the supporting panel.

From the foregoing description and accompanying drawings it will be seen that the invention provides a novel inexpensive sealing element for detachable assembly with a securing clip device for effectively sealing a work opening in a supporting part or panel against the entry therethrough of water, dust, foreign matter and the like, and wherein the sealing element comprises a novel configuration of brim portion which insures a positive seal between the sealing element and the confronting surface of the supporting panel.

The terms and expressions which have been used are terms of description and not of limitation and there is no intention in the use of such terms and expressions of excluding any equivalents of any of the features shown and described or portions thereof, but it is recognized that various modifications are possible within the scope of the invention claimed.

I claim:

1. A deformable sealing element for a work opening in a part such as a panel and adapted for detachable assembly with an object securing sheet metal clip of the type which includes a body portion having a generally planar surface thereon and a pair of spaced movable shank elements projecting from said surface of the body portion, said sealing element being comprised of pliable material, such as rubber and including a generally radially extending base in the form of a continuous circular flexible flange portion and a flexible generally centrally disposed hollow-head portion projecting symmetrically from one side of said flange portion, said flange portion having an outer terminal edge which is disposed in outwardly spaced relation to the external configuration of said head portion, said hollow-head portion defining a cavity therein, said base having a passageway extending therethrough to a juncture with said cavity to provide communication between the latter and the exterior of said sealing element, said cavity being adapted to receive the shank elements of the clip therein for mounting said sealing element in substantially undeformed condition on the clip, means in said cavity adapted for interlocking coaction with the shank elements of the clip for detachably maintaining said sealing element in assembled relation with the clip, and said flange portion having at least one circumferentially extending preformed deformable corrugation thereon, the ridge of said corrugation being disposed intermediate the exterior of said head portion and the outer terminal edge of said flange portion in a radial direction relative to said flange portion and projecting in the direction of extension of said head portion.

2. A deformable sealing element for a work opening in a part such as a panel and adapted for detachable assembly with an object securing sheet metal clip of the type which includes a body portion having a generally planar surface thereon and a pair of spaced movable shank elements projecting from said surface of the body portion, said sealing element being comprised of pliable material, such as rubber and including a generally radially extending base in the form of a continuous circular flexible flange portion and a flexible generally centrally disposed hollow-head portion projecting symmetrically from one side of said flange portion, said flange portion having an outer terminal edge which is disposed in outwardly spaced relation to the external configuration of said head portion, said hollow-head portion defining a cavity therein, said base having a passageway extending therethrough to a juncture with said cavity to provide communication between the latter and the exterior of said sealing element, said cavity being adapted to receive the shank elements of the clip therein for mounting said sealing element in substantially undeformed condition on the clip, means in said cavity adapted for interlocking coaction with the shank elements of the clip for detachably maintaining said sealing element in assembled relation with the clip, said flange portion comprising a circumferentially extending radially linear inner section which is disposed generally obliquely with respect to said head portion and slants outwardly therefrom, commencing at said head portion, in the direction of projection of said head portion and an outer circumferentially extending radially linear section disposed generally obliquely with respect to said head portion and slanting outwardly from the outer end of said inner section in a direction generally opposite to the direction of projection of said head portion, said inner and outer sections defining a preformed continuous deformable circular ridge on said flange portion adapted for sealing engagement with the supporting part.

3. In combination, a malleable-like sheet metal clip adapted for mounting over a work opening in a supporting part and comprising a generally planar body and a pair of spaced movable arms integrally connected to said body intermediate the ends of said arms and substantially in the plane of said body, said arms defining a pair of shank elements projecting from one surface of said body and a pair of shank actuating tabs projecting from the opposite surface of said body, means on said clip for attaching an object thereto and in mounted relation on the supporting part, and a deformable sealing element comprised of pliable material, such as rubber, detachably mounted on said clip, said sealing element being adapted to extend through the work opening and seal the latter against the passage of foreign matter in the attached position of said clip, said sealing element comprising a generally radially extending base in the form of a continuous flexible flange portion engageable on one side thereof with said one surface of said body and a flexible hollow-head portion projecting from the other side of said flange portion in a direction away from said one surface, said head portion defining a cavity which communicates with the exterior of said sealing element by means of a passageway extending through said base to a juncture with said cavity, said shank elements being received through said passageway into said cavity to mount said sealing element in substantially undeformed condition on said clip, means in said cavity adapted for interlocking coaction with the shank elements of the clip for detachably maintaining said sealing element in assembled relation with the clip, said flange portion being of generally circumferentially extending preformed corrugated configuration with the deformable ridge of the corrugation being disposed intermediate the exterior of said head portion and the outer terminal edge of said flange portion in a generally radial direction relative to said flange portion and projecting in the direction of extension of said head portion, the under side of said ridge being disposed in spaced relation to said one surface of said body, said ridge being adapted for sealing engagement with the supporting part.

4. In combination, a malleable-like sheet metal clip adapted for mounting over a work opening in a supporting part and comprising a generally planar body and a pair of spaced movable arms integrally connected to said body intermediate the ends of said arms and substantially in the plane of said body, said arms defining a pair of shank elements projecting from one surface of said body and a pair of shank actuating tabs projecting from the opposite surface of said body, means on said body for attaching an object thereto and in mounted relation on the supporting part, and a deformable sealing element comprised of pliable material, such as rubber, detachably mounted on said clip, said sealing element being adapted to extend through the work opening in the supporting part and seal the work opening against the passage of foreign matter in the attached position of said clip, said sealing element comprising a generally radially extending base in the form of a continuous circular flexible flange portion engageable on one side thereof with said one surface of said body and a flexible, dome-shaped hollow-head portion projecting symmetrically from the other side of said flange portion in a direction away from said one surface, said flange portion having an outer defining edge disposed in outwardly spaced relation to the exterior configuration of said head portion, said head portion defining a cavity which communicates with the exterior of said sealing element by means of a passageway extending through said base to a juncture with said cavity, said shank elements being received through said passageway into said cavity to mount said sealing element in substantially undeformed condition on said clip and with said shank elements being disposed in generally juxtaposed relation to confronting surface portions of said cavity, said surface portions coacting in interlocking relation with said shank elements to resist withdrawal of said shank elements from said cavity and thus maintain said sealing element and clip in assembled relation, and said flange portion comprising a circumferentially extending radially linear inner section which is disposed generally obliquely with respect to said head portion commencing at such head portion and slants outwardly therefrom in the direction of projection of said head portion and an outer circumferentially extending radially linear section disposed generally obliquely with respect to said head portion and slanting outwardly from the outer end of said inner section in a direction generally opposite to the direction of projection of said head portion, said inner and outer sections defining a preformed continuous deformable circular ridge on said flange portion projecting in the direction of extension of said head portion, the under side of said ridge being disposed in spaced relation to said one surface of said body, said ridge being adapted for sealing engagement with the supporting part.

5. In a fastening assembly comprising a supporting part such as a panel having a work opening therethrough, a malleable-like sheet metal clip mounted on said supporting part over said work opening and comprising a generally planar body and a pair of spaced movable arms integrally connected to said body intermediate the ends of said arms and substantially in the plane of said body, said arms defining a pair of tabs projecting from one surface of said body and a pair of shank elements projecting from the opposite surface of said body, said shank elements being of generally outwardly directed bent configuration, and a deformable sealing element comprised of generally resilient material, such as rubber, detachably mounted on said clip, said sealing element comprising a generally radially extending base in the form of a continuous flexible flange portion disposed intermediate said body and the confronting side of said supporting part and a flexible generally hollow head portion projecting from one side of said flange portion and extending through said work opening, said flange portion having an outer defining edge disposed in overlapping relation to the defining edge of said work opening, said flange portion having at least one circumferentially extending preformed deformable corrugation thereon with the ridge of the corrugation being disposed intermediate the exterior of said head portion and the outer defining edge of said flange portion in a radial direction relative to said flange portion and extending in the direction of projection of said head portion, said head portion defining a cavity therein, said base having a passageway therethrough providing a communication from said cavity to the exterior of said sealing element, said shank elements extending through said work opening into said cavity and in generally juxtaposed relation to defining surface portions of said cavity and being moved outwardly to generally permanently deformed positions and in secured relation in the work opening in response to inward movement of said tabs to generally permanently deformed positions, said shank elements upon said movement deforming said head portion of said sealing element against defining surface portions of said work opening and clamping sections of said head portion between said shank elements and the other side of the supporting part and in engaged relation therewith to close the work opening against the passage of foreign matter in the secured position of said shank elements, said shank elements drawing said body of said clip against the said flange portion to thereby deform said corrugated flange portion and clamp the latter between said body and said supporting part, said flange portion engaging said supporting part and said body at radially spaced locations to insure positive sealing of said work opening against the passage therethrough of foreign matter, and means on said body for attaching an object thereto and mounting the latter on said supporting part.

6. In a fastening assembly comprising a supporting part such as a panel having a work opening therethrough, a malleable-like sheet metal clip mounted on said supporting part over said work opening and comprising a generally planar body and a pair of spaced movable arms integrally connected to said body intermediate the ends of said arms and substantially in the plane of said body, said arms defining a pair of tabs projecting from one surface of said body and a pair of shank elements projecting from the opposite surface of said body, said shank elements being of generally outwardly directed bent configuration, and a deformable sealing element comprised of generally resilient material, such as rubber, detachably mounted on said clip, said sealing element comprising a generally radially extending base in the form of a continuous circular flexible flange portion disposed intermediate said body and the confronting one side of said supporting part and a generally hollow flexible dome shaped head portion projecting from one side of said flange portion and extending through said work opening, said flange portion having an outer defining edge disposed in overlapping relation to the defining edge of said work opening, said flange portion comprising an obliquely disposed circumferentially extending radially linear inner portion projecting outwardly from said head portion commencing at said head portion and in the general direction of extension of said head portion and a circumferentially extending radially linear outer portion extending obliquely outwardly from the outer end of said inner portion and in a general direction away from the direction of projection of said head portion to provide said flange portion with a preformed generally corrugated configuration with the deformable ridge of said corrugation projecting in the direction of extension of said head portion, said head portion defining a cavity therein, said base having a passageway therethrough providing a communication from said cavity to the exterior of said sealing element, said shank elements extending through said work opening into said cavity and in generally juxtaposed positional relation to defining surface portions of said cavity and being moved outwardly to generally permanently deformed positions and in secured relation in the work opening in response to inward movement of said tabs to generally permanently deformed positions, said shank elements upon said movement thereof deforming said head portion of said sealing element against defining surface portions of said work opening and clamping sections of said head portion between said shank elements and the other side of the supporting part and in engaged relation therewith while at the same time drawing said body of said clip inwardly against said corrugated flange portion to thereby compress the latter between said body and the confronting surface of said supporting part, said flange portion engaging said supporting part and said body at radially spaced locations including said ridge and the outer terminal edge of said flange portion, to thereby seal the work opening against the passage of foreign matter in the secured position of said shank elements, and means on said body for securing an object thereto and mounting the latter on said supporting part.

References Cited in the file of this patent

UNITED STATES PATENTS

| | | |
|---|---|---|
| 2,061,145 | Duffy | Nov. 17, 1936 |
| 2,266,270 | Roth | Dec. 16, 1941 |
| 2,586,502 | Backus | Feb. 19, 1952 |
| 2,696,318 | Kihm | Dec. 7, 1954 |
| 2,875,487 | Holton | Mar. 3, 1959 |
| 2,924,864 | Holton | Feb. 16, 1960 |

FOREIGN PATENTS

| | | |
|---|---|---|
| 1,056,050 | France | Oct. 21, 1953 |